ly processing. A digital reference matrix apparatus is disclosed for

United States Patent
Rosenbaum

[11] 3,995,254
[45] Nov. 30, 1976

[54] DIGITAL REFERENCE MATRIX FOR WORD VERIFICATION

[75] Inventor: Walter Steven Rosenbaum, Silver Spring, Md.

[73] Assignee: International Business Machines Corporation, Armonk, N.Y.

[22] Filed: July 16, 1975

[21] Appl. No.: 596,338

[52] U.S. Cl. ................................. 340/146.3 WD
[51] Int. Cl.² ........................................ G06K 9/00
[58] Field of Search ......... 340/146.3 ED, 146.3 WD

[56] References Cited
OTHER PUBLICATIONS

Giangardella et al.; Spelling Correction by Vector Representation Using a Digital Computer, Dec. 1967; IEEE Transactions on Engineering Writing & Speech, vol. EWS-10, No. 2, pp. 57-62.

*Primary Examiner*—Joseph M. Thesz
*Attorney, Agent, or Firm*—John W. Henderson, Jr.

[57] ABSTRACT

A digital reference matrix apparatus is disclosed for verifying input alpha words from a keyboard, character recognition machine, or voice analyzer as valid linguistic expressions. The organization of the digital reference matrix is based upon the character transfer function of the input apparatus. The digital reference matrix contains a vector representation for each dictionary word in the form of a calculated vector magnitude and unique vector angle. The set of magnitudes and angles is stored in the digital reference matrix using a form of run length coding by storing a single magnitude pointer followed by the chain of unique angles for words having the same magnitude. The vector magnitude so calculated constitutes the address data for accessing the digital reference matrix. When an input word is received for verification, the word's magnitude and angle attributes are calculated and the digital reference matrix is accessed at the magnitude of the input word and the corresponding angles are searched for a match. An output signal is generated indicating whether or not the input word is valid. The organization of the digital reference matrix minimizes the size of the array needed for accurate word verification representation through the use of the combination of digital angle representation and run length compaction of the magnitude/angle verification syntax.

3 Claims, 2 Drawing Figures

FIG. 2

DIGITAL REFERENCE MATRIX

| OCCUPIED MAGNITUDES | LEGAL ANGLE VALUE | | | | | | |
|---|---|---|---|---|---|---|---|
| 10 | 21.83° | 35.04° | 42.53° | 73.81° | | | |
| 17 | 88.00° | | | | | | |
| 243 | 34.27° | 39.22° | 77.03° | | | | |
| 256 | 62.41° | 89.88° | | | | | |
| 6 | 17.10° | 35.68° | 41.59° | 75.66° | 81.73° | 89.92° | |
| 7 | 35.62° | | | | | | |
| 8 | 35.62° | 48.81° | 75.23° | | | | |
| 9 | 18.53° | 83.55° | | | | | |
| 14 | 01.72° | 16.73° | 25.72° | 28.97° | 75.21° | | |
| 35 | 40.23° | | | | | | |
| 256 | 40.45° | | | | | | |
| 1 | 20.77° | | | | | | |
| 35 | 40.23° | | | | | | |
| 256 | 45.45° | | | | | | |
| 1 | 20.77° | | | | | | |
| 35 | 18.71° | 20.17° | 25.82° | 33.38° | 42.21° | · · · | 88.77° |
| 37 | 72.75° | 74.21° | 79.88° | 83.24° | 85.21° | 90.00° | |
| 225 | 74.75° | | | | | | |
| 7 | 02.53° | 07.36° | 15.21° | 75.77° | 79.32° | | |
| 212 | 19.75° | | | | | | |
| 231 | 09.23° | 38.61° | 45.82° | | | | |
| 245 | 75.74° | | | | | | |
| 246 | 31.72° | 54.24° | 67.10° | 73.93° | 81.15° | 81.15° | 84.89° |

INDEX TABLE

| ABSOLUTE MAG | BYTE ADDRESS |
|---|---|
| 257 | 301 |
| 513 | 618 |
| 769 | 1820 |
| 1026 | 2530 |
| 8193 | 9021 |

DIGITAL REFERENCE MATRIX FOR WORD VERIFICATION

BACKGROUND OF THE INVENTION

1. Field of the Invention

The invention disclosed herein relates to data processing devices and more particularly relates to post processing devices for keyboards, character recognition machines, and speech analyzers.

2. Description of the Prior Art

A threshold problem in post processing of the output stream from a keyboard, character reader, or voice analyzer is presented by the necessity of executing a quick comparison of the output word with a dictionary of acceptable words and generating a go/no go signal indicating the presence or absence of a conventional word.

Attempts have been made in the prior art to formulate an efficient means for converting the information in an alpha word to a significant address for storage means so as to access information as to whether that output word was, in fact, correctly spelled. For example, J. J. Giangardello, in the *IEEE Transactions on Engineering Writing and Speech*, Vol. EWS-10, No. 2, December 1967, page 57, in an article entitled "Spelling Correction by Vector Representation Using a Digital Computer," discloses the use of vector representation of alpha words by assigning the numbers 1 through 26 to the letters "A" through "Z" respectively and calculating a vector magnitude and angle for accessing the word from a memory in a general purpose computer. This disclosure, suffers from a defect which is typical of the prior art, namely, that the conversion of the garbled word to be examined into a key address results in an ambiguous access. The vector address generated can randomly access an occupied or valid address for one or more dictionary words without any of the dictionary word corresponding to the intended word which was garbled into the word under examination. In other words, the representations are not unique for each valid dictionary word. What is needed in the art is an apparatus which generates address vectors for words under examination, which have no ambiguity, and yet maintain the size of the reference matrix within reasonable bounds.

A step toward this goal was made by A. M. Chaires, et al., in U.S. Pat. No. 3,925,761, entitled "Binary Reference Matrix for a Character Recognition Machine," issued Dec. 9, 1975 and assigned to the same assignee as the present application. Chaires, et al discloses a binary reference matrix wherein each letter in the alphabet is assigned a unique numeric value and a vector magnitude and angle is calculated for each dictionary word. The magnitude and angle form the $x$ and $y$ coordinates for the matrix with a binary 1 being stored in each position of the matrix representing a valid dictionary word and a binary 0 in those positions not representing a valid dictionary word. While the organization of the binary reference matrix minimizes the size of the array needed for accurate verification by choosing numerical values for the alphabetic characters in an inverse proportion to the characters' propensity for error, the representations for the dictionary words in the Binary Reference Matrix (BRM) are not unique and error events must be associated with a propensity to map a garbled word into a sparsely populated region of the matrix to minimize the likelihood of false verification due to round off error in the magnitude and angle BRM representations. This necessitates that a substantial number of blank storage locations be provided in order to create the sparsely populated region required.

OBJECTS OF THE INVENTION:

It is an object of this invention to determine, in an improved manner, whether a word in its input stream is a valid dictionary word.

It is another object of this invention to eliminate the need for blank storage locations in the dictionary word storage matrix.

SUMMARY OF THE INVENTION:

These and other objects of the invention are accomplished by providing a digital reference matrix apparatus which verifies input alpha words as valid linguistic expressions. The apparatus includes a storage array containing digital representations for the vector magnitude and angle of each valid linguistic expression. The digital representations are determined in accordance with an alpha word vector representation (AWVR) formula which produces a magnitude and an absolutely unique angle for each word represented. The magnitude and angles are then run-length coded into the storage array.

The apparatus receives a word to be verified at its input and converts the word into its magnitude and angle attributes in accordance with the AWVR. The magnitude serves as an address which is checked against the addresses in the storage array. If a match occurs, the angles which correspond to the address/magnitude are read out of the storage array into an angle storage buffer where they are compared to the angle of the input word. If the input angle is equal to one of the stored angles, a flag bit is set to indicate that the input word is valid. If either the magnitude or angle is not matched a flag bit is set to indicate that the input word is invalid.

BRIEF DESCRIPTION OF THE DRAWINGS

The foregoing and other objects, features and advantages of the invention will be apparent from the following more particular description of the preferred embodiments of the invention, as illustrated in the accompanying drawings.

FIG. 2 shows a map of the organization in the digital reference matrix.

DESCRIPTION OF THE PREFERRED EMBODIMENT

Figure 1:
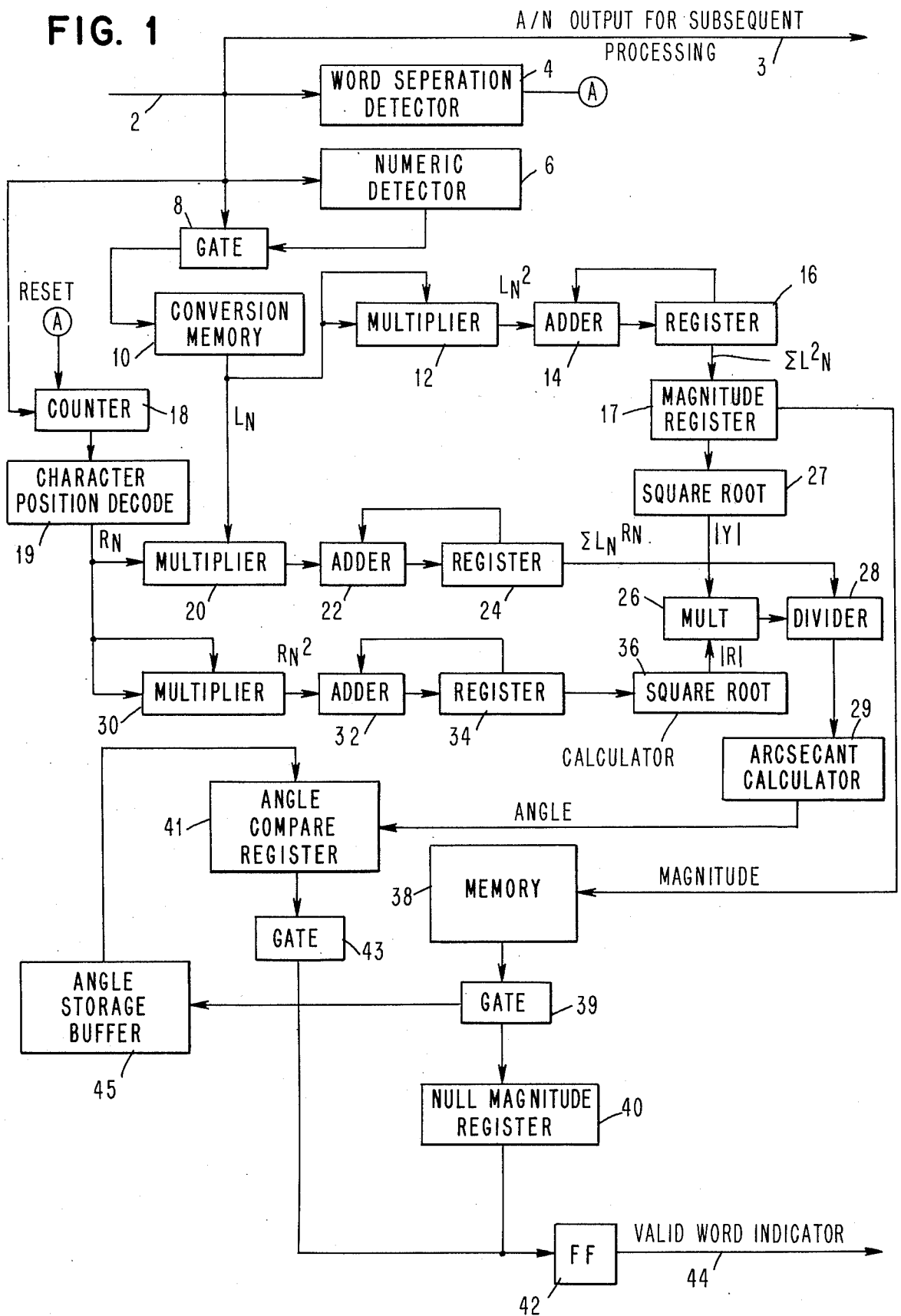
FIG. 1 shows the digital reference matrix apparatus invention.

Theory: The Digital Reference Matrix (DRM) approach was conceived as a highly efficient, low-storage approach to validating whether a word was spelled, keyed, or read correctly. Logically, the DRM must contain a representation in some manner of all words which might be anticipated in documents typed on a keyboard, scanned by an OCR, or words spoken. This list of valid linguistic expressions may, at times, be even broader than the Webster dictionary. Therefore, conventional storage, access and search techniques against the dictionary may not be acceptable, particularly in a real-time application. The goal of the verification technique is to minimize storage and search time for a large dictionary associated with a particular application.

The DRM is a specialized application of the Alpha Word Vector Representation (AWVR) technique. The mechanics of the technique are shown in Table 1.

Table 1.

Numeric Extraction of Alpha Field
A = 1, B = 2, C = 3, D = 4, E = 5, F = 6,
G = 7, H = 8, I = 9, J = 10, —, Z = 26

Step 1
Vector Mapping CORNWALL → (3, 15, 18, 14, 23, 1, 12, 12)

Step 2
Vector Attributes (3, 15, 18, 14, 23, 1, 12, 12) → Magnitude, Angle
Magnitude = Function of Characters in Word $$\sum_{N=1}^{M} L_N^2 = (3)^2 + (15)^2 + (18)^2 + (14)^2 + (23)^2 + (1)^2 + (12)^2 + (12)^2 = 1572 = Y^2$$

Angle = Function of Character Position $$= \sec^{-1} \frac{|Y||R|}{\Sigma L_N R_N} = 83.7392 \text{ Degrees}$$

where R is the reference vector for each word length (M) comprising an "N"-tuple of linearly independent terms corresponding to the position of each letter in the word, e.g., $\sqrt{2}, \sqrt{3}, \sqrt{5}, \sqrt{6}, \ldots \sqrt{J}$ or log 3, log 5, log 7, log 11, ..., log K, where $\sqrt{J}$ is irrational and K is a prime number, and with $$|R| = \sqrt{(\sqrt{2})^2 + (\sqrt{3})^2 + (\sqrt{5})^2 + \ldots (\sqrt{J})^2},$$
etc.

Basically, the underlying rationale of the AWVR is that any word or character string can be mapped into a vector representation by assigning a unique numeric value to each letter in the alphabet. One of the most direct and intuitive assignment schemes would be designating A=1, B=2, C=3, ..., z=26. Any vector representation of a word so generated would, in turn, be uniquely reconstitutable in terms of the linear algebra vector attributes of magnitude and angle. Where:
 a. Magnitude reflects word character contents
 b. Angle reflects relative positioning of characters within the word.

It should be noted at this point that just by using a magnitude/angle representation, any length alpha word may be represented uniquely by using only four bytes of storage.

A significant degree of compaction has already been realized by being able to represent alpha words uniquely, regardless of their length, as a two number pair. The final form of the verification function, however, carries this compaction one step further by storing the magnitude/angle duets using the Digital Reference Matrix (DRM).

The DRM is an outgrowth of the Binary Reference Matrix (BRM) method of magnitude/angle compaction disclosed in U.S. Pat. No. 3,925,761 by Chaires et al. The DRM organization is shown in FIG. 2. In the DRM, the set of valid duets of magnitude and angle are stored using run length coding. This takes advantage of clustering over certain ranges of magnitude that can be induced when a large word list is mapped into magnitude/angle representation using the AWVR. Hence, when several verification dictionary entries have generated the same magnitude and only differ by their respective angle attributes, their magnitude pointer is stored only once, successive legal angle values are chained by turning on their higher order bit, and the chain of legal angles is stored (logically) right adjacent to the magnitude pointer.

The storage required for the DRM magnitude pointers can, itself, be reduced by using a modulo 256 convention and an Index Table to describe the matrix's magnitude axis. The Index Table supplies the absolute displacement for each magnitude run of 256 unit. By this means, storage of each magnitude pointer requires nominally just one byte. (Reference lower part of FIG. 2.)

The compaction efficiency of the DRM is related to the degree of clustering present in the distribution of legal magnitudes. The alpha/numeric equivalencing scheme (reference top of FIG. 2) can be manipulated to induce salutory magnitude density characteristics in the AWVR mapping of the verification dictionary into vector form. In application, the DRM represents each entry in the verification word list using an average 1.16 to 1.25 bytes per entry independent of the number of alpha characters originally in the word. For example, a ten thousand word verification vocabulary would be storable using between 11.6k to 12.5K bytes of storage. State of the art alpha storage techniques would require nominally 80k bytes of storage to store the same word list. In addition, the DRM machine operations related to verification are approximately an order of magnitude faster than alpha character string table lookup procedures that would be used on the uncompacted word list.

A second DRM compaction methodology using dual run length coding of magnitude and angle is shown in Table 2. A full tyte (eight bits) is used for angle storage giving 256 units of resolution. All angles having the same magnitude are stored contiguously with the leftmost angle byte preceded by a four bit header field. The three lower order bits of the header field tell how many angle values are chained at this magnitude. The highest order bit in the four bit header field tells whether the next magnitude value is one unit removed from the present magnitude value. For example, the highest order bit in the four bit header field is set "off" if the present magnitude value is 98 and the next magnitude value is 99. The next magnitude value is impliedly displaced and does not require a discrete representation.

| Vector Word List | |
|---|---|
| Magnitude | Angle |
| 123 | 16.72° |
| 123 | 30.10° |
| 123 | 42.36° |
| 123 | 82.60° |
| 123 | 88.83° |
| 125 | 12.31° |
| 125 | 60.20° |
| 126 | 7.72° |
| 126 | 12.23° |
| 126 | 19.12° |
| 126 | 33.31° |
| 126 | 40.05° |
| 126 | 49.91° |
| 126 | 70.79° |
| 126 | 75.23° |
| 126 | 82.96° |
| 127 | 27.28° |

Table 2

DRM Organization With Dual Run Length
Coding of Magnitude and Angle

| DRM Segment | | | | | | | |
|---|---|---|---|---|---|---|---|
| 1 1 0 1 | 16.72° | 30.10° | 42.36° | 82.60° | 88.83° | | |
| 125 | 0 0 1 0 | 12.31° | 60.20° | | | | |
| 1 1 1 1 | 7.72° | 12.23 | 19.12 | 33.31° | 40.05° | 49.91° | 70.79° | 75.23° |
| 126 | 0 0 0 1 | 82.96° | | | | | |

The highest order bit in the four bit header field is set "on" if the next magnitude value is out of sequence, e.g., present magnitude 103 followed by magnitude 105. The highest order bit in the four bit header field is also set "on" if a magnitude has over eight angle values associated with it. After the first run of eight angle values has been stored, the additional (over flow) angles require that the original magnitude value by listed again. Hence, the unit magnitude increment progression is broken.

Whenever the highest order header field bit is turned "on" the byte following its appended angles is the magnitude related to the next run of angle bytes. The value of this byte added to the displacement of this section of the DRM with respect to its Index Table (FIG. 2) entry point yields in absolute terms the magnitude value for the next run of angle bytes. This byte is called the Magnitude Index Calibration Byte (MICB). The use of the Index Table for determining absolute magnitude value is explained above.

An optional aspect of the DRM organization is to seed the DRM every 50 or 100 bytes with an MICB. This allows the DRM Magnitude Axis to be binary searched to get as close as possible to the proper location before beginning the magnitude by magnitude search. This methodology of the DRM eliminates the requirement that each angle's higher order bit be checked for a chaining flag and requires that only out of sequence magnitude value be stored discretely. The average store requirement per dictionary entry in this format is about nine bits.

Once the DRM has been set up, the verification procedure for an input word follows by computing the word's magnitude and angle attributes and accessing the DRM at the magnitude of the input word and searching for a matching angle.

SPECIFIC DESCRIPTION OF THE INVENTIVE APPARATUS

The digital reference matrix apparatus is shown in FIG. 1. A combined alphanumeric stream output from a keyboard, character recognition machine, or voice analyzer is input over line 2 to the system of FIG. 1. A word separation detector 4 connected to the input line 2 detects for the existence of a word separation symbol indicating the commencement of a new word. Since both alphabetic and numeric characters are on the input stream, the numeric detector 6 connected to the input line 2 detects whether an input character is an alpha or a numeric character. Numeric detector 6 activates gate 8 which allows only alphabetic characters to pass to the conversion memory 10. The conversion memory 10 contains the alphanumeric equivalency scheme which relates the alphabetic characters with weighted numeric values as determined by the technique disclosed in Chaires, et al, referenced above. The numerical weighting value for a character "N" is designated $L_N$. The conversion memory 10 outputs the value $L_N$ on the data bus 11.

The accessing means for addressing magnitude listings in the memory 38 comprises the multiplier 12, the adder 14, the register 16 and the magnitude register 17. The value of $L_N$ input on the data bus 11 is squared in the multiplier 12 and added to the sum of previous squared values of $L_N$ in the alpha word under analysis by the adder 14 and register 16. The process of calculating the value of the sum of $L_N^2$ continues until the word separation detector 4 detects the next word separation symbol input on the line 2. At this time, the final value of the sum of $L_N^2$ is loaded into a magnitude register 17 as the address for the magnitude of a word in the memory 38, based upon the values of $L_N$ assigned to the characters of which the input alpha word is composed.

The angle calculation means for the input word comprises the counter 18, character position decode 19, multiplier 20, adder 22, register 24, multiplier 26, divider 28, arcsecant calculator 29, multiplier 30, adder 32, register 34, square root calculator 27, and square root calculator 36. The counter 18 counts the position of the characters in each alpha word processed by the apparatus. The output of counter 18 is decoded by character position decode 19 to provide the pre-set value of $R_N$ on the input line to the multiplier 20. As previously stated under theory of operation, the value of $R_N$ is a linearly independent number for each letter position in the word. The value of $L_N$ on data bus 11 is input to the multiplier 20 and multiplied times the present value of $R_N$ and the product is input to the adder 22. Adder 22 and register 24 maintain the running sum of the products of $L_N$ times the $R_N$ for the alpha word under analysis. When the word separation detector 4 detects the next word separation symbol on the input line 2 register 24 outputs the final sum of $L_N$ times $R_N$ to the divider 28. The present character position value $R_N$ is output from the character position decode 19 to the multiplier 30 generating the value $R_N^2$ which is output to the adder 32. Adder 32 and register 34 maintain a running sum of the squares of $R_N$ and when the word separation detector 4 detects the next separation symbol in the input stream 2, the final sum of $R_N^2$ is output to the square root calculator 36. The square root calculator 36 takes the square root of the sum of the $R_N$ squares yielding the value $|R|$ which is input to the multiplier 26. Square root calculator 27 calculates the square root of the sum of the $L_N^2$ to yield $|Y|$. Multiplier 26 multiplies the value of the magnitude of Y times the magnitude of R from the square root calculator 36 and outputs the product as the numerator to the divider 28. The value of sum of the $L_N$ times $R_N$ which is input from register 24 to the divider 28 serves as the denominator and the quotient is output to the arcsecant calculator 29. The angle value output from the arcsecant calculator 29 is loaded into angle compare register 41.

The memory 38 has an organization which is based upon the character transfer function of the machine whose output stream is being analyzed. The organization of the memory 38 is based on the AWVR technique described under Theory of Operation. All valid magnitudes followed by the corresponding unique angles for each valid dictionary word are stored in memory 38 as shown in FIG. 2. The rightmost bit position in each angle byte is reserved as an indicator to indicate if additional angles follow for the magnitude under consideration. The calculated magnitude for the input word stored in magnitude register 17 accesses memory 38 as an address for a corresponding magnitude stored therein. If no address match occurs then gate 39 passes the magnitude through to null magnitude register 40 which sets a 0 bit in flip-flop 42 signalling that the input word is invalid.

If the magnitude of the input word matches an address in memory 38, gate 39 passes all the corresponding angles for the memory address into angle storage buffer 45. The angles in angle storage buffer 45 are then compared by angle compare register 41 to the angle for the input word calculated by arcsecant table 29. If a match is found, gate 43 sets 1 bit in flip-flop 42 signalling that the input word is valid on line 44, but if no match occurs the flip-flop 42 is set to 0 indicating that the input word is invalid. The output from the DRM can be used to signal the keyboard operator that a typographical error has occurred or to signal interpretative machinery to go into a retry mode.

OPERATION

The operation of the word verification apparatus will be described with reference to FIG. 1. Whenever an alphabetic word is detected on input stream 2 of the digital reference matrix apparatus, numeric detector 6 activates gate 8 to pass the letters of the word into conversion memory 10. Conversion memory 10 sequentially converts each letter in the alphabetic word into a predetermined numeric value $L_N$. The numerical representations $L_N$ for the alphabetic letters in the input word are serially output by conversion memory 10 on bus 11. Each numerical representation $L_N$ is received by multiplier 12 where it is multiplied times itself to provide $L_N^2$. The output of multiplier 12, $L_N^2$, is added by adder 14 to the contents of register 16 to provide a running sum of the square of the numerical representations for the letters of the input word. The final sum of the numerical representations for the letter in the word is stored in magnitude register 17 and defines an address in memory 38. Magnitude register 17 accesses memory 38 for an address which corresponds to the calculated vector magnitude, $\Sigma L_N^2$, for the input word. If no corresponding address is found in memory 38, gate 39 signals null magnitude register 40 which triggers flip-flop 42 to set a signal on output bus 44 indicating that the input word is not a valid dictionary word.

Concurrent with the generation of the vector magnitude for the input alpha word, a corresponding vector angle is generated. Counter 18 counts the position of the letters in the input alpha word and activates character position decode 19 to output a unique letter position value $R_N$ for each letter position in the word. The output $R_N$ of the character position decode 19 for each letter position in the input alpha word is received by multiplier 20 and multiplied times the numerical representation for the corresponding letter $L_N$ from conversion memory 10 and added by adder 22 to the contents of register 24 to provide a running sum of the numerical representation of the letter times the position of the letter in the word. Also, the letter position number $R_N$ is input to multiplier 30 where it is multiplied times itself and added by adder 32 to the contents of register 34 to provide a running sum of the squares of $R_N$. When the word separation detector 4 detects the next separation symbol in the input stream 2, the final sum of $R_N^2$ is output to the square root calculator 36, the contents of the magnitude register 17 are output to square root calculator 27, and the contents of register 24 are output to divider 28. The square root calculator 36 takes the square root of the sum of the $R_N$ squares yielding the magnitude of the vector R and the square root calculator 27 takes the square root of the magnitude which is the sum of the $L_N$ squares yielding the magnitude of the vector Y. Multiplier 26 multiplies the magnitude of vector R times the magnitude of vector Y and outputs the product as the numerator to divider 28. The value of the sum of the $L_N$ times $R_N$ which has been input from register 24 to the divider 28 serves as the denominator to divider 28 and the quotient from divider 28 is output to the arcsecant calculator 29. The arcsecant calculator 29 calculates an angle value for the quotient and outputs the angle value to the angle compare register 41.

If during the access of memory 38 by magnitude register 17, a corresponding address was found, the angles stored at that address in memory 38 are gated by gate 39 from memory 38 into angle storage buffer 45. The contents of angle storage buffer 45 are now compared with the calculated angle stored in angle compare register 41. If an equal compare is found, gate 43 triggers flip-flop 42 to provide an output signal on line 44 indicating that the input word is a valid dictionary word.

Those of skill in the art will recognize that the digital reference matrix can also be applied to the validation of words containing special characters as well as alpha words by merely assigning conversion codes to the special characters and storing the corresponding magnitude/angle duet in the memory 38.

While the invention has been particularly shown and described with reference to the preferred embodiment thereof, it will be understood by those skilled in the art that the foregoing and other changes in form and detail may be made therein without departing from the spirit and scope of the invention.

I claim:

1. A digital reference matrix apparatus for verifying input alpha characters as valid linguistic expressions comprising:
   detection means for detecting the presence of an alpha word at the input of said apparatus;
   a conversion memory connected to said detection means for encoding each character in the input alpha word into a numeric value;
   calculation means connected to said conversion memory for converting the alpha word into a vector having a magnitude $$Y^2 = \sum_{N=1}^{M} L_N^2$$

where $L_N$ is the numeric value assigned to each character in the word and an absolutely unique angle $$\theta = \sec^{-1} \frac{|Y||R|}{\sum_{N=1}^{M} L_N \cdot R_N}$$

where $R_N$ is a unique number indicating the position of each letter in the alpha word and $|R|$ is a vector whose elements are $R_N$;

memory means containing the dictionary of valid alpha words encoded in accordance with the vector magnitude and angle representation;
  accessing means connected to said calculation means and said memory means for accessing said memory means for an address equal to the calculated magnitude;
  compare means connected to said memory means and said calculator means for comparing the calculated angle with the angle stored at the magnitude/address in said memory means; and
  flag means connected to said memory means and said compare means for producing a signal indicating whether the input alpha word is valid.

2. The apparatus of claim 1 wherein said memory means contains run length coded magnitudes of the vectors representing valid dictionary words followed by the associated absolutely unique angle having a bit indicating whether it is followed by another absolutely unique angle for the same magnitude.

3. The apparatus of claim 1 wherein said memory means contains a header field preceding the angle fields indicating whether the next magnitude value is sequential by a factor of one and how many absolutely unique angle values follow.

\* \* \* \* \*